Sept. 18, 1934.   C. C. RICHARD   1,974,217
TOOL RETAINER
Filed June 16, 1930
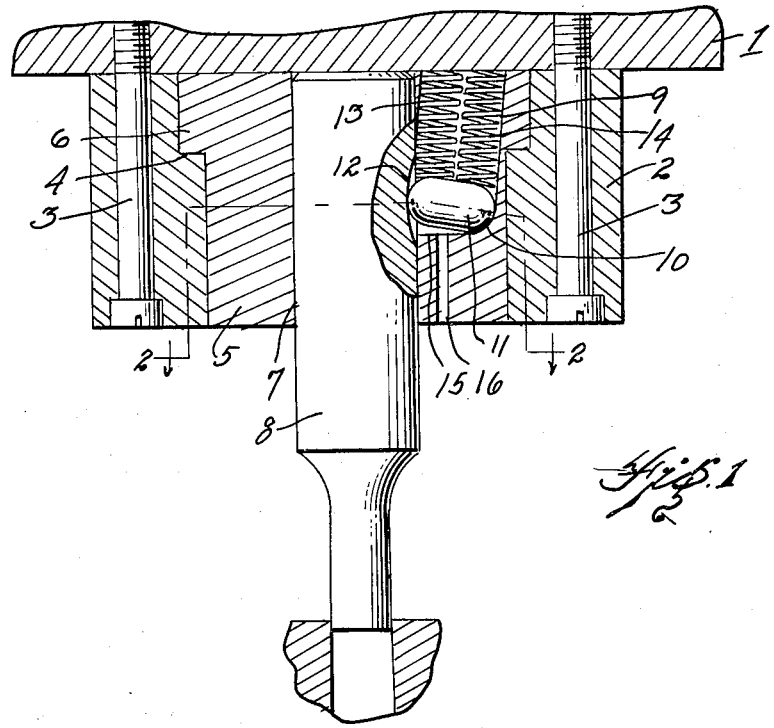
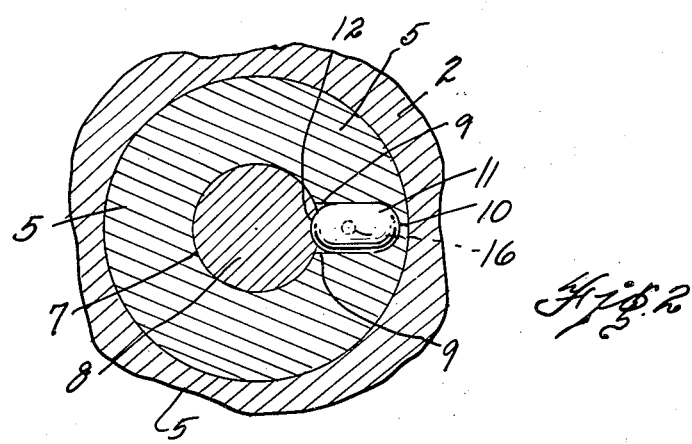
Clement C Richard   INVENTOR.
BY
ATTORNEY.

Patented Sept. 18, 1934

1,974,217

UNITED STATES PATENT OFFICE 1,974,217

TOOL RETAINER

Clement C. Richard, Detroit, Mich., assignor to Allied Products Corporation, Detroit, Mich., a corporation of Illinois Application June 16, 1930, Serial No. 461,355

6 Claims. (Cl. 279—77)

This invention relates to tool retainers, and the object of the invention is to provide a retainer for punches, dies and similar tools, in which the tool is held in the retainer by a wedging action and by which it is prevented from longitudinal movement in either direction and also from rotative movement in the retainer.

Another object of the invention is to provide a retainer having a wedging member mounted to allow pivotal movement thereof in the retainer and having yieldable means forcing the said wedging member into engagement with the shank of a punch, die or similar tool.

A further object of the invention is to provide a retainer in which the wedging member may be readily disengaged from the tool shank to allow removal of the tool from the retainer.

A further object of the invention is to provide a tool shank having a notch or groove in which the wedging member is adapted to engage and the wedging member when properly engaged therein preventing rotative movement of the tool in relation to the retainer, and also preventing withdrawal of the tool from the retainer.

These objects and the several novel features of the invention are hereinafter more fully described and claimed and the preferred form of construction by which these objects are attained is shown in the accompanying drawing in which—

Fig. 1 is a longitudinal section through a retainer embodying my invention.

Fig. 2 is a section taken on line 2—2 of Fig. 1.

As shown in Fig. 1, a base or head-block 1 is provided to which an annular holder 2 is secured by the machine screws 3. The annular holder 2 is provided with a shoulder 4 and the retainer 5 is provided with a flange or enlarged portion 6 engaging behind the shoulder 4 so that when the holder 2 is secured to the base or head-block 1 by the screws 3, the retainer 5 is secured in position against the face of the base or head-block 1. The retainer 5 is provided with an aperture 7 for the tool shank 8 and a recess 9 is formed in the retainer extending at a slight angle to and opening into the tool aperture 7 intermediate its ends. The recess 9 at the bottom is rounded at 10 to provide a semi-spherical seat for the wedging member 11 as shown in Fig. 1. This wedging member 11 is cylindrical in form and is provided with semi-spherical ends as shown in Figs. 1 and 2, and one end of the member 11 seats on the semispherical seat 10 in which the member 11 pivots. The tool shank 8 is provided with a groove 12 cut in the face thereof and in transverse section this groove is arcuate in form and is cut on the same radius as the semi-spherical end of the member 11, while in longitudinal section the groove is considerably lengthened but is also of a curved form as shown in Fig. 1.

The free end of the member 11 opposite its pivot in the seat 10 is forced into engagement with the groove 12 in the tool shank by the two coiled springs 13 and 14 positioned in the recess 9, and these springs engage against the base 1 as shown and maintain a pressure against the member 11 tending to force it downwardly.

When the tool shank is not positioned in the tool aperture 7, the springs 13 and 14 force the member 11 downwardly against the bottom 15 of the recess 9 with one end resting in the semispherical seat 10 provided therefor in the recess 9. As the tool is moved up into the aperture 7, the free end of the member 11 engaged by the tool shank 8 is turned upwardly against the tension of the spring 13, while the opposite end of the member 11 pivots in the semi-spherical seat 10. As the tool shank 8 is moved up to engagement with the base 1, the springs 13 and 14 force the end of the member 11 down into the groove 12 until the member 11 wedges tightly between the groove 12 and the semispherical seat 10. At this time, the tool shank 8 cannot be withdrawn from the retainer due to the wedging action of the member 11 and the curved face of the groove 12, as will be understood from Fig. 1, as it would be necessary to compress the member 11 by withdrawal of the tool shank.

The wedging action of the member 11 wedges the tool shank into tight engagement with the inner surface of the aperture 7 and thus the tool shank is firmly supported over a considerable portion of its surface in the retainer and is very rigidly held so that in punching or cutting operations the tool cannot come loose in the retainer. However, if the operator wishes to remove the tool from the retainer, he may insert a rod or other instrument through the aperture 16 in the retainer and turn the wedging member 11 upwardly against the tension of the spring 13 until the member 11 is moved out of the groove 12 at which time the tool may be readily removed from the retainer. While the turning movement of the member 11 is resisted mainly by the spring 13, the spring 14 also slightly resists turning movement of the said member and also holds the pivotal end of the said member in engagement with its semi-spherical seat 10. By use of a wedge member having a groove engaging end of a shape to provide for practically a line contact between said end of the wedge member and the groove in any of the relative possible positions, as for instance by forming the said end on a radius less than the radius of the groove longitudinally of the punch, the wedge may turn on its axis eccentric to the axis of the punch groove and thus feed into the groove as the punch moves longitudinally toward its seat either by reason of the give or spring of the parts or through wear between the end of the punch and its seat. By this relationship of the parts, the wedge member not only operates to prevent withdrawal of the punch but functions to compensate for wear or change in position of the punch longitudinally of its aperture and thus maintains the end of the punch at all times in pressure engagement with its seat thereby preventing lost motion of the punch in its aperture. The wedge is preferably of cylindrical form permitting it to be made of bar stock and therefore is inexpensive and very simple to construct with accuracy and may vary in size both in diameter and length depending upon the size of the retainer and punch or die with which it is to be associated.

From the foregoing description it becomes evident that the device is very simple and efficient in operation, will not easily get out of order, will hold the tool firmly when positioned therein and provides a device which accomplishes the objects described.

Having thus fully described my invention, its utility and mode of operation, what I claim and desire to secure by Letters Patent of the United States is—

1. In a tool retainer, a retainer member having a tool aperture and provided with a recess extending at an angle to and opening into said tool aperture, the said recess being provided with a semi-spherical seat, a cylindrical wedge member having semi-spherical ends, one of said ends engaging in said semi-spherical seat and being pivotally mounted therein, the free end of said wedge member being turnable into the tool aperture, yieldable means tending to turn said wedge member on its pivot into said tool aperture and a tool shank having an arcuate groove for receiving the free end of said wedge member when inserted in the tool aperture, said free end of the wedge member having a radius less than the radius of the groove in the tool shank, the retainer being provided with an aperture extending through the face of the retainer beneath the free end of the wedge member and permitting insertion of an instrument to turn the wedge member out of engagement with the groove of the tool shank.

2. In a tool retainer, a retainer member having a tool aperture and provided with a recess extending at an angle to and opening into said tool aperture intermediate its ends, the said recess being provided with a semi-spherical seat, a cylindrical wedge member having semi-spherical ends, one of said ends engaging in said semi-spherical seat and being pivotally mounted therein, the opposite end of said wedge member being turnable into the tool aperture, yieldable means tending to turn said wedge member on its pivot into said tool aperture and a tool shank adapted to be positioned in said tool aperture and having a groove to receive the free end of the wedge member, the said groove being cut on the same radius transversely as the free end of the wedge member and being cut on a greater radius longitudinally than the radius of the free end of the wedge member.

3. In a tool retainer, a retainer member having a tool aperture and provided with a recess extending at an angle to and opening into said tool aperture intermediate its ends, the said recess being provided with a semi-spherical seat, a cylindrical wedge member having semi-spherical ends, one of said ends engaging in said semi-spherical seat and being pivotally mounted therein, the opposite end of said wedge member being turnable into the tool aperture, a pair of springs tending to turn said wedge member on its pivot into said tool aperture and a tool shank having an arcuate groove extending longitudinally of the shank for receiving the free end of the said wedge member when inserted in the tool aperture, said free end of the wedge member having a radius less than the radius of the groove engaged thereby, the said groove being arcuate in cross section and being cut on the same radius as the end of the wedge member.

4. In a tool retainer, a base, a retainer member secured thereto and having a tool aperture, the said member being provided with a recess extending at an angle to the tool aperture and opening into said tool aperture intermediate its ends, a wedge member pivotally mounted in said recess to turn into said tool aperture, yieldable means tending to turn the end of the wedge member into the tool aperture, the free end of the wedge member being semi-spherical in form and a tool shank adapted for insertion in said tool aperture and provided with an arcuate groove extending longitudinally of the tool shank adapted to receive the semi-spherical end of the wedge member, the last named end of the wedge member being formed on a radius less than the radius of the said arcuate groove.

5. In a tool retainer, a retainer member having a tool aperture and provided with a recess extending at an angle to and opening into said tool aperture, a cylindrical wedge member pivotally mounted in said recess and provided with semi-spherical ends, yieldable means tending to turn said wedge member into the tool aperture and a tool shank insertable in the tool aperture and provided with a longitudinally curved groove in its face adapted to receive the semi-spherical end of the said wedge member, said last named end of the wedge member fitting the groove transversely and having a radius less than the radius of the groove longitudinally of the shank.

6. In combination, a tool, a holder therefor having a body provided with a bore for receiving the tool, a seat at the bottom of the bore engaged by the end of the tool on insertion of the same longitudinally therein, a wedge member having one end pivotally supported in the holder to swing in an arc longitudinally of the bore, the bore for the tool having an aperture through which the opposite end of the wedge member may be moved, and spring means for so moving the said end of the wedge member, the tool having an arcuate groove extending longitudinally thereof engaged by the last named end of the wedge member upon insertion of the tool in the the bore, the axis of the wedge member being eccentric to the axis of the groove and the groove engaging end of the wedge member being of such form as to provide for practically a line contact thereof with the surface of the groove in any of the possible positions of the said wedge end therein whereby, as wear takes place between the end of the tool and its seat in use permitting further movement of the tool longitudinally of its bore, the wedge member moves further into the groove to thereby constantly maintain the end of the tool in engagement with its seat.

CLEMENT C. RICHARD.